(12) United States Patent
Hartwich et al.

(10) Patent No.: US 9,178,764 B2
(45) Date of Patent: Nov. 3, 2015

(54) DEVICE AND METHOD FOR SERIAL DATA TRANSMISSION AT A HIGH DATA RATE

(75) Inventors: Florian Hartwich, Reutlingen (DE); Ralf Machauer, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 92 days.

(21) Appl. No.: 13/883,629

(22) PCT Filed: Nov. 3, 2011

(86) PCT No.: PCT/EP2011/069268
§ 371 (c)(1),
(2), (4) Date: Aug. 20, 2013

(87) PCT Pub. No.: WO2012/059521
PCT Pub. Date: May 10, 2012

(65) Prior Publication Data
US 2013/0322463 A1   Dec. 5, 2013

(30) Foreign Application Priority Data
Nov. 5, 2010   (DE) .......................... 10 2010 043 484

(51) Int. Cl.
*H04L 12/24* (2006.01)
*G06F 13/40* (2006.01)
*H04L 12/413* (2006.01)

(52) U.S. Cl.
CPC .......... *H04L 41/083* (2013.01); *G06F 13/4072* (2013.01); *H04L 12/4135* (2013.01)

(58) Field of Classification Search
CPC .............. H04L 41/083; H04L 12/4135; G06F 13/4072
See application file for complete search history.

(56) References Cited

U.S. PATENT DOCUMENTS

| 5,920,204 A | 7/1999 | Bruno |
| 7,394,281 B1 | 7/2008 | Bandholz et al. |

(Continued)

FOREIGN PATENT DOCUMENTS

| CN | 1491008 A | 4/2004 |
| JP | 7-86897 | 3/1995 |
| WO | WO 00/57557 | 9/2000 |

OTHER PUBLICATIONS

International Search Report, International Application No. PCT/EP2011/069268, dated Apr. 27, 2012.

(Continued)

*Primary Examiner* — Mohammad Anwar
(74) *Attorney, Agent, or Firm* — Kenyon & Kenyon LLP (57) ABSTRACT

A device for connecting to a two-wire communications bus, a bus station that, while utilizing the device, is able to send messages, represented on the bus lines as dominant and recessive bus levels, to additional connected bus stations and receive same from them. The device includes (a) an arrangement setting a dominant bus level in the form of a first voltage difference between the two bus lines by driving a first electric current, and the device is suitable for the recessive bus level to set in as the second voltage difference between the two bus lines, at least partially by the flowing of a discharge current via terminating resistors connected to the bus lines; and (b) an arrangement to speed up the setting of at least one of the bus levels by driving at least one additional electric current, at least in response to the presence of a switching condition.

24 Claims, 6 Drawing Sheets

(56) References Cited

U.S. PATENT DOCUMENTS

2011/0199131 A1* 8/2011 Boezen .................. 327/109
2013/0148753 A1* 6/2013 Willms .................. 375/259

OTHER PUBLICATIONS

G. Cena and A. Valenzano "Overclocking of Controller Area Networks," Electronic Letters, Oct. 28, 1999, vol. 35, No. 22, p. 1923-1925.

CAN Data Transmission Layer, in: Konrad Etschberger, Controller Area Network, Dec. 31, 2002, XP002671220, Chapter 2, pp. 59-63 with partial English translation.

Konrad Etschberger: "Controller Area Network", in "2.1 CAN Datenuebertragungschicht, Prinzip der Busarbitrierung" Dec. 31, 2002, Hanser, Munchen, XP002671220, ISBN: 3-446-21776-2, pp. 59-63.

\* cited by examiner

DEVICE AND METHOD FOR SERIAL DATA TRANSMISSION AT A HIGH DATA RATE

FIELD OF THE INVENTION

The present invention relates to a device and a method for rapid transmission of data between at least two users of a bus system.

BACKGROUND

From ISO Standard 11898, for example, a Controller Area Network (CAN) as well as a "Time-Triggered CAN" (TTCAN) version of the CAN is known. The media access control method used in the CAN is based on a bit-wise arbitration. In a bit-wise arbitration, a plurality of user stations is simultaneously able to transmit data via the channel of the bus system, without thereby interfering with the data transmission. Furthermore, the user stations are able to ascertain the logical state (0 or 1) of the channel while transmitting a bit over the channel. If a value of the bit sent does not correspond to the ascertained logical state of the channel, the user station terminates the access to the channel. In CAN, the bit-wise arbitration is usually carried out in an arbitration field within a message that is to be transmitted via the channel.

Because of the bit-wise arbitration, a non-destructive transmission of the message over the channel is achieved. Because of this, good real time properties of the CAN come about, whereas media access control methods, in which the message sent by a user station is able to be destroyed during transmission via the channel, based on a collision with a further message sent by another station, have a clearly more unfavorable real time behavior since, based on the collision and the new transmission of the message required thereby, a delay in the data transmission comes about.

The protocols of the CAN are particularly suitable for transmitting short messages under real time conditions. If larger data blocks are to be transmitted via a CAN domain, the relatively low bit rate of the channel becomes a limiting factor. In order to assure the correct functioning of the bit-wise arbitration, during the arbitration, a minimum duration is must be maintained for the transmission of a bit, so that all the bus users have a uniform picture of the state of the bus (0 or 1) and equal priority access to the state of the bus, the minimum duration being a function of an extension of the bus system, the signal propagation speed on the channel, and intrinsic processing times in the interface modules of the bus users.

Therefore, increase of the bit rate would be problematic since this would reduce the duration of the individual bits. Since the signal propagation speed on the channel is essentially fixed, then, in case shorter bit lengths are to be achieved, a smaller extension of the bus system or lower intrinsic processing times are required. With respect to the intrinsic processing times, those times essentially correspond to that which is required until the respective bus level sets in. In this connection, one should note that, to set the dominant bus level, the sending station in each case, using a corresponding output stage, drives a current onto the bus which leads to the buildup of a corresponding voltage difference. In contrast, a recessive bus level sets in by the voltage difference between the two bus lines becoming reduced via terminating resistors or changing to a value deviating from the dominant bus level. This deviating value may be zero but may also be a voltage difference different from zero.

G. Cena and A. Valenzano, in "Overclocking of controller area networks" (Electronics Letters, vol. 35, No. 22 (1999), p. 1924) treat, from a theoretical point of view, the effects of overclocking the bus frequency in subsections of the message on the effectively achieved data rate, without, however, going into details of the methodology and the problem of the factors limiting the bus frequency, such as the signal propagation speed and intrinsic processing times in the interface modules of the bus users.

It may be seen in the cited documents that the related art does not supply satisfactory results from every point of view.

SUMMARY

An object of the present invention is to provide a device and/or method by the use of which user stations, such as control units, are able to transmit messages in a short time in a two-wire bus system including dominant and recessive bus levels.

The present invention is explained with the aid of a further development of a CAN bus system, in which, because of the device proposed, messages are able to be transmitted in a shorter time than is possible in a CAN network from the related art. For this purpose, a transceiver is proposed that is modified compared to CAN Standard 11896. The present invention is also able to be used in the same way in other bus systems in which one of the bus levels sets in, that is, a voltage difference between lines, by the flowing of a current via terminating resistors. The present invention described may, of course, also be used in TTCAN networks.

The object described is attained in the device according to the present invention in that a sending station speeds up the setting of the recessive bus level by driving a suitable, if necessary, additional electric current.

In this connection, it may be of advantage to design the device according to the present invention to be switchable, so that the additional driven current strength is used for setting the bus level only in a certain state. In this way, for example, the method according to the present invention is able to be used only in certain sections of a message that is to be transmitted. Furthermore, it is possible thereby to switch over, in running operation, between bus communication according to the current standard and one that is sped up.

In the case of a change from dominant to recessive bus level, the device according to the present invention advantageously drives a specified current between the two bus lines, so that the target voltage difference is achieved more rapidly in the recessive case. In this connection, the driven current may be limited by a temporal limitation or by a power limitation or by measuring the voltage difference and switching off upon reaching a certain threshold value. This is particularly important because other stations have to have the possibility of overwriting the recessive bus level by a dominant bit. This case is able to occur both during the arbitration and upon detection of an error, to name just two examples.

It is also of advantage for the device according to the present invention, in response to a change from a recessive to a dominant bus level, to modify the driven current compared to the devices known from the related art. It is possible that the respective current is increased, or an additional current is supplied in parallel. A reduction in the current strength, and accordingly a slowing down of this edge change may, however, also be meaningful, for instance, in order to hold the electromagnetic radiation, radiated on the average per time unit, within specified limits. This response, too, may be made a function of a switching condition.

In one particularly advantageous form, the device is designed so that the switching condition of the device is ascertained by itself by the analysis of the data signals received. It is also advantageous if the device reports back its current switching state to the actuating controller, through a suitable output.

DETAILED DESCRIPTION

Example embodiments are described for the method and device according to the present invention. These specific examples are used to explain, but do not limit the scope of, the invention. The bus system under discussion is assumed to be a two-wire communications bus, with two conducting connections whose potential difference represents the bus signal. One of the two lines may also be represented, for example, by conductive body parts of an automobile, which conductive body parts are connected to one another in a conductive manner.

Figure 1:
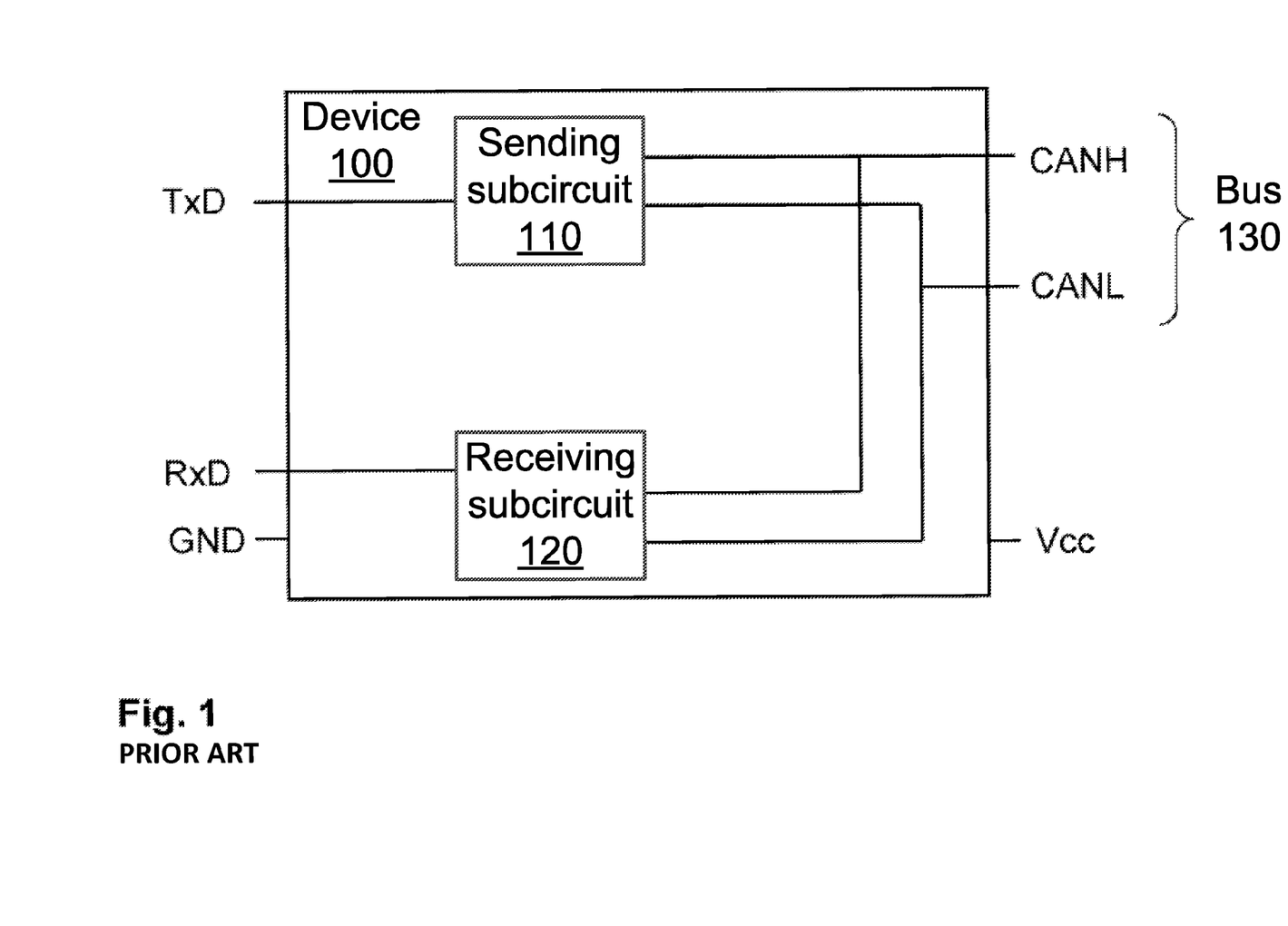
FIG. 1 shows a schematic block diagram of a transceiver according to the related art, including inputs and outputs to the controller and the bus connections, voltage supply and ground.

FIG. 1 shows a prior art block diagram of a device 100. The device includes a circuit including circuit elements which may be subdivided into a sending subcircuit 110 and a receiving subcircuit 120. The sending subcircuit 110 and the receiving subcircuit 120 may be connected to each other or have common circuit elements. The device also includes the connecting possibilities that are usual for transceivers from the related art, such as terminals CANH, CANL for connecting to communications bus 130, terminals RxD and TxD for receiving and sending logical data from or to the communications controller, terminal Vcc for providing a supply voltage, and GND for supplying a ground. Further possible terminals according to the related art may include, for example: enable inputs, prompting inputs, standby inputs, etc. These have been omitted here for the sake of simplicity. Sending subcircuit 110 generates output signals for bus terminals CANH and CANL, based on at least the sending signal TxD of the communications controller. Receiving subcircuit 120 generates a receiving signal RxD for the communications controller, based on at least the difference of the input signals of bus terminals CANH and CANL.

Figure 2:
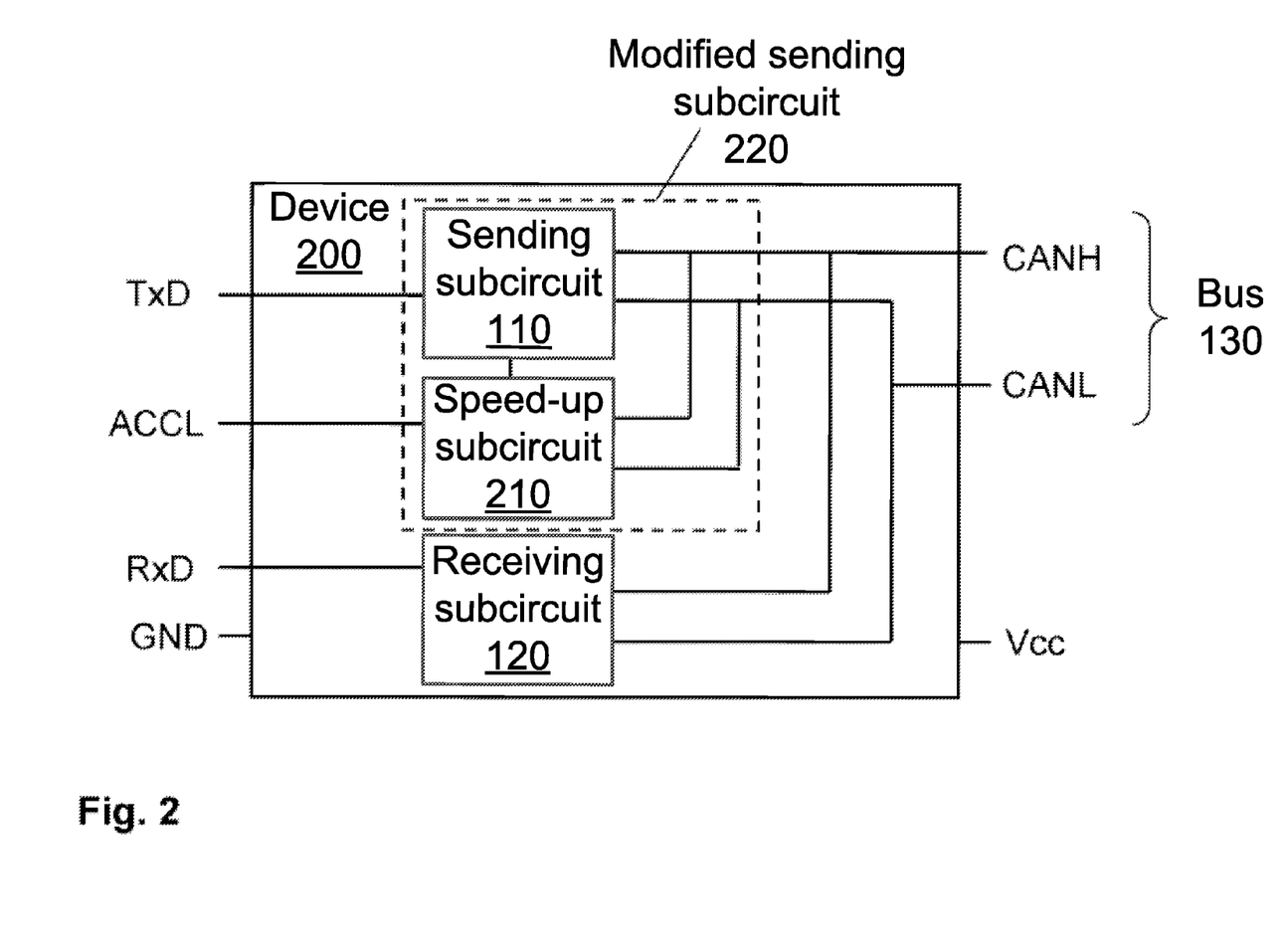
FIG. 2 shows a schematic block diagram of a device according to an example embodiment of the present invention, including an additional transmitting subcircuit and an additional input to its change-over switching.

In contrast, device 200 according to the present invention of the form shown in FIG. 2 includes an additional terminal ACCL which is used for switching between the response known from the related art and the sped-up response according to the present invention. A signal is read in via terminal ACCL from which the presence of a valid switchover condition is read out by the device. The terminal is connected to an additional speeding-up subcircuit 210, which is additionally in connection to sending subcircuit 110.

In the simplest case, the evaluation of the ACCL input takes place in the following manner. If a logical TRUE condition is present on the ACCL terminal, speeding-up subcircuit 210 generates output signals based on the signals received by sending subcircuit 110. If a logical FALSE condition is present on the ACCL terminal, speeding-up subcircuit 210 is inactive. One may, however, also specify another optional signal or a sequence of signals, which have to be present at the ACCL terminal so that the device of the present invention derives a valid switchover condition. It is possible to design this signal to be configurable, for instance, by storing a value in a register provided for this, which the device is intended to interpret as the presence of a valid switching condition.

Speeding-up subcircuit 210 is provided access to bus terminals CANH and CANL, so that when a valid switching condition is present, the output signals generated by sending subcircuit 110 are modified by the output signals generated by speeding-up subcircuit 210.

The combination of sending subcircuit 110 and speeding-up subcircuit 210 may be regarded as a modified sending subcircuit 220, which is indicated in FIG. 2 by a dashed line. Example embodiments of this sending subcircuit 220 are given in FIGS. 5 to 6.

Figure 3:
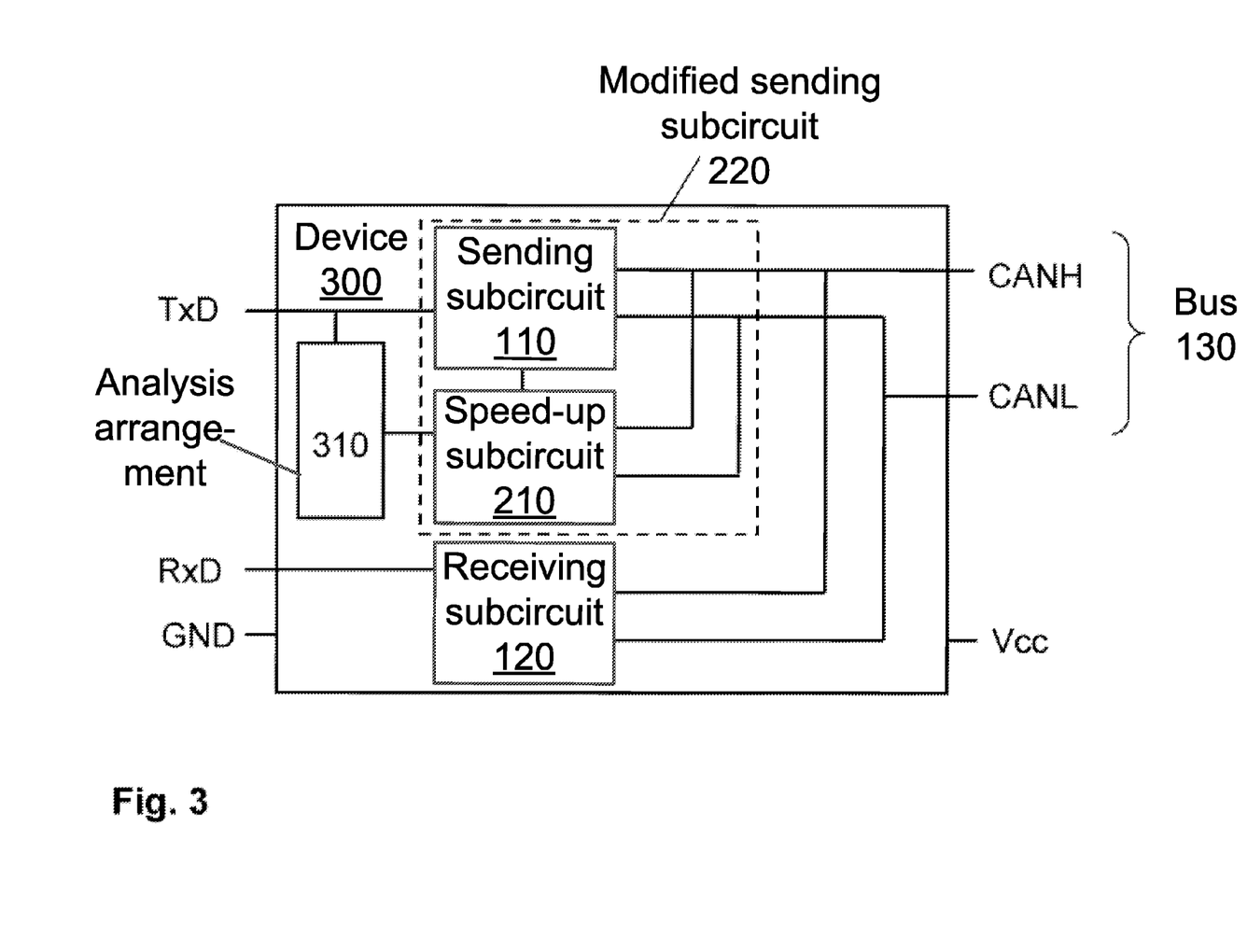
FIG. 3 shows a schematic block diagram of a device according to an example embodiment of the present invention, including an additional sending subcircuit as well as a device for autonomous switching as a function of the analysis of the signals at input TxD.

A further example embodiment of a device 300 according to the present invention is shown in FIG. 3. In this case, the device is designed without switching input ACCL of FIG. 2. Instead, the device includes an analysis arrangement 310 which, in the case shown, is connected to terminal TxD and speeding-up subcircuit 210, and is equipped to decide autonomously on switching the device into the sped-up mode according to the present invention.

For this purpose, an analysis arrangement 310 evaluates the input signals which reach the device from the communications controller, that is, preferably, as shown in FIG. 3, the TxD signal, and generates from this a control signal for speeding-up subcircuit 210. The evaluation of the data signals received from the communications controller may include, for example, the ascertainment of a bit length in time within the signals received, the evaluation of an identification within the message, or even the ascertainment of a switching point of a bit length in time within the message. For the control signal generated by analysis arrangement 310 there applies analogously what was described for the input signal at the ACCL terminal in connection with FIG. 2. In the simplest case, the control signal includes a logical TRUE or FALSE condition. If analysis arrangement 310 generates a logical TRUE as the control signal, speeding-up subcircuit 210 generates output signals based on the signals received by sending subcircuit 110. If a logical FALSE condition is present, speeding-up subcircuit 210 is inactive. Thus, as a function of the control signal which analysis arrangement 310 generates, the output signals generated by sending subcircuit 110 are modified using the output signals generated by speeding-up subcircuit 210, or not, as the case may be. As described in FIG. 2, for the control signal an evaluation may of course also be required, in order to derive the presence of a switching condition. It may be characterized to be configurable.

In addition to or alternatively to basis on the evaluation of sending signal TxD, it is also possible that analysis arrangement 310 obtains its output signal, which activates speeding-up subcircuit 210, for instance, by evaluating receiving signal RxD and/or the signals present at bus terminals CANH, CANL. For this, it is, of course, necessary that the analysis arrangement 310 be provided access to the signals to be evaluated, by corresponding connections. Here too, the evaluation of the data signals received may include, for example, the ascertainment of a bit length in time within the signals received, the evaluation of an identification within the message, or even the ascertainment of a switching point of a bit length in time within the message. In this example embodiment, the device is able to react, for example, not only at a sending attempt but also upon receipt of sped-up messages with reduced bit length, by switching to the sped-up mode according to the present invention. Transceivers of the related art frequently include a prompting logic which analyzes the signals at bus terminals CANH, CANL, and derives from this a prompting request. Analysis arrangement 310 is advantageously able to be integrated into such a prompting logic, if this is also provided in the device according to the present invention. The promptability of devices according to the invention will be discussed in more detail below.

Alternatively, one might do completely without the switching of the device according to the present invention, and the sped-up method according to the present invention could permanently be used. This specific embodiment, which is also not shown in greater detail, comes about from device 200 in FIG. 2 by leaving out the ACCL terminal or by applying a durable TRUE condition.

Device 200 or 300 according to the present invention may be designed so that speeding-up subcircuit 210, in the case of a change from a dominant to a recessive bus level speeds up the setting of the correspondingly provided voltage difference, which may be equal to, or different from zero. This is particularly advantageous, since this edge change in the devices known from the related art takes place relatively slowly, because the voltage difference provided for the recessive level is set, without the speeding-up subcircuit, only by a discharge current which flows via terminating resistors to the signal line.

In one alternative example embodiment, a device according to the present invention may, however, also be designed so that additionally or exclusively during a change from the recessive to the dominant bus level, the setting of the voltage difference is sped up. For this, either an additional speeding-up subcircuit (not shown) may be provided or the behavior of at least one of subcircuits 110 and 120 may be modified to the extent that it drives the current required for setting the dominant bus level more strongly, as a function of the switching over. In this case, an additional switching input ACCL2 (not shown), compared to device 200, may be provided for modified sending subcircuit 220 or, compared to device 300, a separate connection between analysis arrangement 310 and modified sending subcircuit 220, in order to be able to activate separately the speeding up for the two directions of the edge change.

Figure 4:
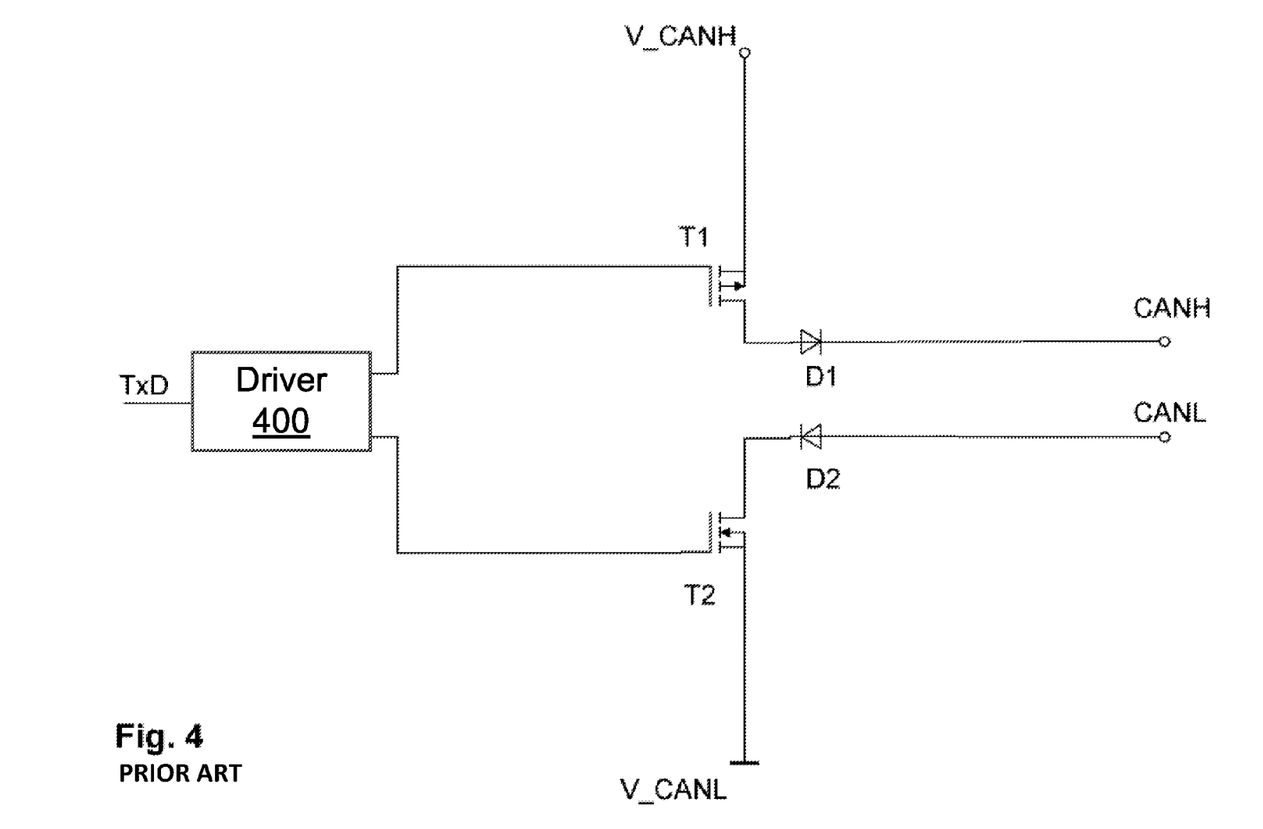
FIG. 4 shows an exemplary cutout from the circuit diagram of a device according to the related art including the essential elements of the sending subcircuit.

FIG. 4 shows an example of a schematic design of sending subcircuit 110 of a device according to the related art. It is made up essentially of a driver component 400, whose two outputs each controls the levels of the two bus lines CANH, CANL via a transistor T1 or T2. Sending signal TxD is modified in a suitable manner by driver component 400, so that when a logical zero is present, the post-connected transistor circuit pulls bus terminal CANH to potential V_CANH and bus terminal CANL to potential V_CANL (dominant bus level), while, when a logical one is present, the post-connected transistor circuit T1, T2 blocks in connection to diodes D1 and D2, and the bus lines, via the terminating resistors (not shown) at the line ends equalize again their potential to a recessive bus level including a voltage difference of approximately zero. In an alternative development from the related art ("low-speed CAN"), in the recessive case, the bus lines are at a voltage difference that significantly deviates from zero.

Figure 5:
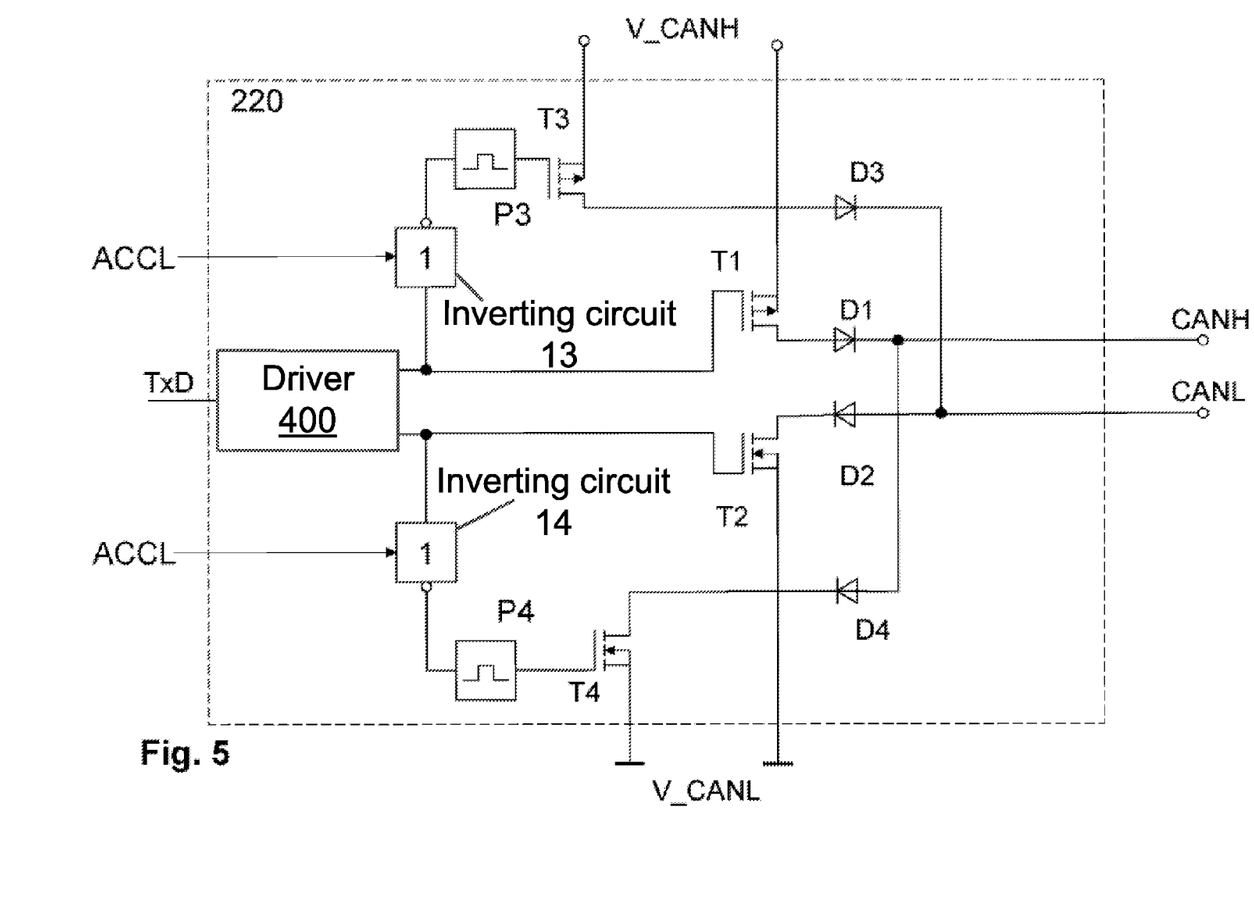
FIG. 5 shows an exemplary cutout from the circuit diagram of a device according to an example embodiment of the present invention including elements of the modified sending subcircuit, made up of the original sending subcircuit and additional elements of the sped-up subcircuit.

In contrast, FIG. 5 shows schematically an exemplary embodiment of a modified sending subcircuit 220, in which original sending subcircuit 110 is supplemented by the additional circuit elements of speeding-up subcircuit 210. The further circuit elements include at each output of the driver component an inverting circuit element 13 and 14 that is switchable by switching signal ACCL, as well as post-connected, for instance edge triggered pulse generators P3 and P4. Instead of edge triggered pulse generators, other pulse generators known to one skilled in the art may naturally also be used, such as threshold value triggered pulse generators. The output pulse is triggered after an edge change of logical zero to logical one (dominant to recessive) at the input of the pulse generator. The outputs of the pulse generators supply the gate voltage for transistors T3, T4 which connect bus lines CANH, CANL via diodes D3 and D4 to potential sources V_CANH and V_CANL.

If there is an activation present by switching signal ACCL (or the switching signal coming from analysis arrangement 310) at switching elements 13 and 14, the latter supply an output signal, inverted with respect to the input signal, to pulse generators P3 and P4, which are edge triggered in the present example, and which, by the application of a suitable gate voltage, briefly switch transistors T3, T4 at low resistance. If there is no activation present, the entire circuit is inactive and does not affect the bus level.

Thus, the circuit design leads to the fact that, when transistor T1 is switched at high resistance by the signal of driver component 400, transistor T3 briefly becomes low-resisting, and analogously, when transistor T2 is switched at high resistance, transistor T4 briefly becomes low-resisting. In this way, speeding-up subcircuit 210 influences the level of bus lines CANH, CANL. In particular, the combination of transistors T3, T4 and diodes D3, D4 is selected so that the line levels are driven exactly in reverse, as by sending subcircuit 110.

By the inverting of the output signal of the driver component in combination with the pulse width limitation, the desired behavior is achieved that at a change from a dominant to a recessive bus state, while the circuit of T1 and D1, and T2 and D2, respectively, blocks, for a short time bus line CANH is connected at low resistance via transistor T4 and diode D4 at potential V_CANL and bus line CANL is connected at low resistance at potential V_CANH via transistor T3 and diode D3. At a suitable selection of the pulse duration, the setting of the recessive bus level is sped up by the circuit, without properties, such as, for instance, the possibility of overwriting the recessive bus level by other control units within the scope of arbitration, or even upon detection of an error, being lost.

In the reverse case, that is, at the transition from a recessive to a dominant bus level, in the exemplary embodiment shown in FIG. 5, the behavior of sending subcircuit 110 essentially does not change by the addition of speeding-up subcircuit 210. While transistors T1, T2 in this case are switched at low resistance by a suitable gate voltage, the gate voltage for T3 and T4 is held by inverters 13, 14 and pulse generators P3, P4 at a value which leads to a high-resistance behavior, since the pulse generators are only triggered by an edge change of logical zero to logical one. During a transition from a recessive to a dominant bus level, if a speeding up is also to be achieved, the driver component, for example, may be modified, as will be explained in connection with FIG. 6.

Figure 6:
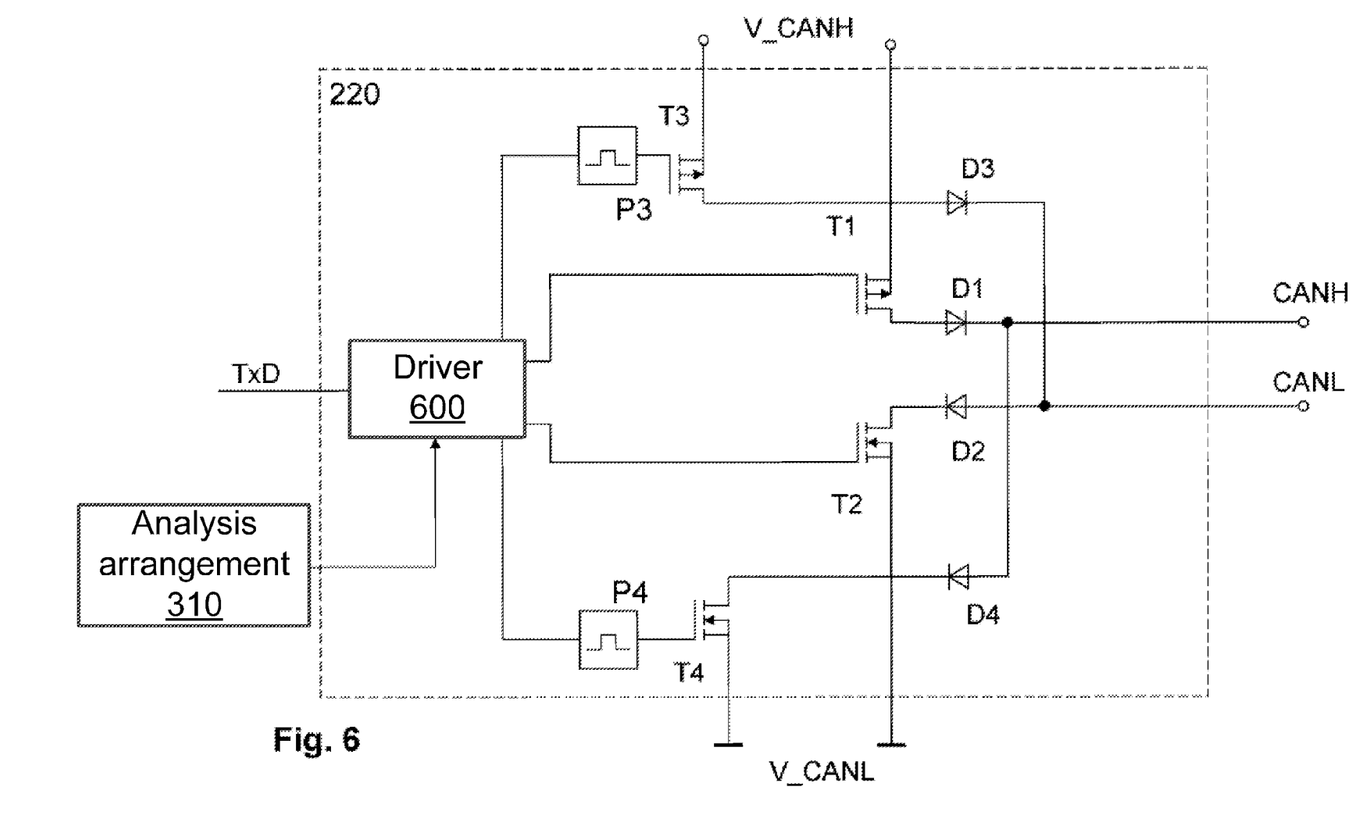
FIG. 6 shows an exemplary cutout from the circuit diagram of an additional example embodiment of a device according to the present invention, including elements of the modified sending subcircuit, made up of the original sending subcircuit and additional elements of the sped-up subcircuit.

FIG. 6 shows how the behavior according to the present invention may also be achieved by using a suitably modified driver component 600. The driver component is activated by the switching signal coming from analysis arrangement 310 to the extent that it converts its behavior to the sped-up behavior according to the present invention. For instance, it provides the inverted outputs of speeding-up subcircuit 210, which applies the brief gate voltages to transistors T3, T4, using, for example, the edge triggered or threshold value triggered pulse generators P3, P4. In the variant shown here, the pulse generators are still shown separately. In one specific embodiment that is not shown, they could also be integrated into the driver component, so that the driver component, directly by providing an appropriate gate voltage, briefly makes transistors T3 and T4 low-resistant. Furthermore, of course, deviating from FIG. 6, the switchover could also take place because of external switching signal ACCL. In addition, modified driver component 600, as a function of the switching signal, is able to adjust additionally or exclusively the output voltages which refer to transistors T1 and T2, so that the change from the recessive to the dominant bus level is sped up. As was touched upon before, the latter behavior may also be activated independently of the behavior first described, by a separate switching signal.

In the specific embodiments described, it was assumed that the gate voltages present at transistors T3, T4, which are supplied by pulse generators P3, P4 are suitably brief. This may be achieved by a corresponding presetting or precontrol. It is also possible, however, that a recording arrangement is provided in the device which, for example, record the duration of the presence of the gate voltage, the charge quantity transmitted, the current strength, the electrical power or the energy applied of the current that has flowed from potential sources V_CANH, V_CANL to bus lines CANH, CANL, and that, as a function of the recorded variable(s), the duration of applying the gate voltages to transistors T3 and T4 is set, or when a threshold is reached, the voltage is interrupted. Additional specific embodiments may provide that the voltage potentials lying on bus lines CANH, CANL are ascertained, for example, at diodes D3 and D4, and that the pulse width is set depending on these values, or, upon reaching a threshold, the voltage is interrupted.

Beyond that, the device according to the present invention, in one example embodiment, may include an additional output, via which the currently present mode (sped up/not sped up) is fed back, for instance, to the communications controller or other switching elements. This feedback may advantageously be used to ensure that the communications controller transmits sped-up data to the device via terminal TxD only when the device has been successfully switched over into the sped-up mode.

Furthermore, the device according to the present invention, in one example embodiment, is able to be equipped to be itself activated or prompted by evaluation of the signals presently on bus lines CANH, CANL, as well as to be able to initiate a prompting process at connected switching elements, for example, the communications controller or a microprocessor. Devices such as those described in the present invention, besides the active state and the switched-off state, usually have at least one additional state, the sleep-operating state, in which the current consumption is minimized to the greatest extent. To prompt from the sleep mode, a separate input may be provided on the device, which is connected to a separate prompting line. However, a prompting process may also be initiated via bus lines CANH, CANL.

In the sleep mode, the device according to the present invention, in the simplest case, observes the bus state, and a prompting process is carried out if the occurrence of a dominant bus level is determined. Then, on the one hand, the device itself becomes active, and, on the other hand, it is able to activate the connected switching elements, such as the communications controller or the microprocessor, by suitable signals. The device may also be defined in such a way that, in sleep mode, it still maintains the capability of analyzing messages present on the bus, and that it only leaves the sleep mode upon receipt of a specified message or a message with a specified address, or a message with a certain identification, for instance, within the data field. A device designed in two stages is also possible, in which the device first changes to an intermediate state, when a dominant bus level is established, in which it develops the capability of analyzing messages present on the bus, for instance by the start of an oscillator provided for this. Upon detection of a specified message or a message with a specified address, or a message with a certain identification, the device is then fully prompted or activated. Moreover, there is the possibility that additionally or exclusively the activation of the connected switching elements, such as communications controllers or microprocessors, is made dependent on established identifiers, the address or the content of the message received on the bus. In this way, a selective prompting of bus stations is able to be implemented via suitable messages.

In the devices according to the present invention, one should note for the selective prompting, if it refers to parts of the message present on the bus, that, even in the sleep mode, the device is to be able to detect the sped-up message sections and to be able to decode them, if necessary.

What is claimed is:

1. A device for connecting a bus station to a communications bus including two bus lines, such that the bus station is able to send messages to, and receive messages from, additional bus stations connected to the bus, the messages being represented as a sequence of dominant and recessive bus levels on the two bus lines, the device comprising:
 a first hardware arrangement for setting a dominant bus level in the form of a first voltage difference between the two bus lines by driving a first electric current, wherein the device is arranged for the recessive bus level to set itself as a second voltage difference between the two bus lines at least partially by flowing of a discharge current via terminating resistors that are connected to the two bus lines; and
 a second hardware arrangement configured to speed up the setting of at least one of the bus levels by driving a second electric current, wherein the second electric current is provided with (i) the first electric current or (ii) the discharge current to increase a total provided current.

2. The device of claim 1, wherein the second hardware arrangement is configured to speed up the setting of the recessive bus level by driving the second electric current in parallel to the flowing of the discharge current via the terminating resistors.

3. The device of claim 2, wherein the second electric current is driven up at least one of: (a) until a threshold value for the voltage difference is reached, (b) for a specifiable time, and (c) until a threshold value for electric power is reached.

4. The device of claim 1, wherein the second hardware arrangement is configured to modify the setting of the dominant bus level by one of changing a current strength of the first electric current and driving an additional electric current in parallel to the first electric current.

5. The device of claim 1, wherein the second hardware arrangement is configured to perform the speed up in response to a presence of a defined switching condition.

6. The device of claim 5, wherein the switching condition is received via an input provided to the device.

7. The device of claim 5, further comprising:
an analysis component that is configured to ascertain the switching condition by evaluating data signals which the device obtains from a controller.

8. The device of claim 7, wherein the device is configured to produce an output that is fed to the controller, the output indicating whether the device has been switched over to the sped-up setting of a bus level.

9. The device of claim 5, further comprising:
an analysis component that is configured to ascertain the switching condition by evaluating data signals which the device receives via the two bus lines.

10. The device of claim 1, wherein the device is configured to assume a first state with a reduced energy requirement, and is configured to transition from the first state to a second state with a higher energy requirement in response to a message.

11. The device of claim 10, wherein, while in the first state and irrespective of whether the message received in the first state is sent sped-up or not sped-up, the device is configured to recognize receipt of the message, identify the received message as a prompting message directed to the device, and, responsive to the receipt and identification of the prompting message, activate connected components.

12. The device of claim 1, wherein the device is configured to:
assume a first state with a reduced energy requirement;
while in the first state, recognize receipt of a message;
responsive to the recognized receipt of the message, transition to a second state in which the device is able to recognize receipt of, and identify, a prompting message that is directed to the device, irrespective of whether the prompting message is sent sped-up or not sped-up; and
responsive to the recognized receipt and identification of the prompting message, (a) transition to a third state with a higher energy requirement than that of the first state and (b) activate connected components.

13. The device of claim 1, wherein the second voltage difference is zero.

14. A device for connecting a bus station to a communications bus including two bus lines, such that the bus station is able to send messages to, and receive messages from, additional bus stations connected to the bus, the messages being represented as a sequence of dominant and recessive bus levels on the two bus lines, the device comprising:
a first hardware arrangement for setting a dominant bus level in the form of a first voltage difference between the two bus lines by driving a first electric current, wherein the device is arranged for the recessive bus level to set itself as a second voltage difference between the two bus lines at least partially by flowing of a discharge current via terminating resistors that are connected to the two bus lines;
an analysis component that is configured to ascertain a presence of a defined switching condition by evaluating data signals which the device receives via the two bus lines, wherein the evaluation includes one of (a) ascertaining a switching time within a message, (b) evaluating an identification within a message, and (c) ascertaining a bit length with respect to time; and a second hardware arrangement configured to, in response to the presence of the defined switching condition, speed up the setting of at least one of the bus levels by driving a second electric current.

15. A method for transmitting messages between bus stations via a communications bus that includes two bus lines, the messages being represented on the two bus lines as a sequence of dominant and recessive bus levels, the method comprising:
setting, by hardware circuitry, the dominant bus level in the form of a first voltage difference between the two bus lines by driving a first electric current, wherein the recessive bus level sets itself as a second voltage difference between the two bus lines at least partially by flowing of a discharge current via terminating resistors that are connected to the two bus lines; and
speeding up, by the hardware circuitry, the setting of at least one of the bus levels by driving a second electric current, wherein the second electric current is provided with (i) the first electric current or (ii) the discharge current to increase a total provided current.

16. The method of claim 15, wherein the speeding up is of the setting of the recessive bus level, and is performed by driving the second electric current in parallel to the flowing of the discharge current via the terminating resistors.

17. The method of claim 16, wherein the second electric current is driven up at least one of: (a) until a threshold for the voltage difference is reached, (b) for a specifiable time, and (c) until a threshold value for electric power is reached.

18. The method of claim 15, wherein the speeding up is of the setting of the dominant bus level, and is performed by one of changing a current strength of the first electric current and by driving an additional electric current in parallel to the first electric current.

19. The method of claim 15, wherein the speeding up is carried out in response to a presence of a defined switching condition.

20. The method of claim 15, further comprising:
outputting information to a controller that provides to the hardware circuitry signals that cause the hardware circuitry to perform the speeding up, wherein the information indicates whether the setting of the at least one of the bus levels is in a speeded up state.

21. The method of claim 15, wherein the bus stations are configured to assume a first state with a reduced energy requirement, and are configured to transition from the first state to a second state with a higher energy requirement in response to a message.

22. The method of claim 21, wherein, for each of at least one of the bus stations, while the bus station is in the first state and irrespective of whether the message received by the bus station in the first state is sent sped-up or not sped-up, the bus station is configured to:
recognize receipt of the message;
identify the received message as a prompting message directed to the bus station; and
responsive to the receipt and identification of the prompting message, enter the second state.

23. The method of claim 15, wherein each of at least one of the bus stations is configured to:
assume a first state with a reduced energy requirement;
while in the first state, recognize receipt of a message;
responsive to the recognized receipt of the message in the first state, enter a second state in which the bus station is configured to recognize receipt of, and identify, a prompting message directed to the bus station, irrespective of whether the prompting message is sent sped-up or not sped-up; and responsive to the receipt and recognition of the prompting message in the second state, transition to a third state with a higher energy requirement.

24. The method of claim 15, wherein the second voltage difference is zero.

* * * * *